(12) United States Patent
Miller et al.

(10) Patent No.: US 12,384,370 B2
(45) Date of Patent: Aug. 12, 2025

(54) SYSTEMS AND METHODS FOR STARTING UP AND SHUTTING DOWN A MACHINE

(71) Applicant: Caterpillar Global Mining Equipment LLC, Denison, TX (US)

(72) Inventors: Jason Lee Miller, Princeville, IL (US); Luke T. Melchior, Sahuarita, AZ (US); Christopher L Wynkoop, Eureka, IL (US); Dustin Dale Denning, Chillicothe, IL (US); Brett Michael Nee, Germantown Hills, IL (US); Peter H. Huang, Edwards, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 249 days.

(21) Appl. No.: 18/054,822

(22) Filed: Nov. 11, 2022

(65) Prior Publication Data
US 2024/0157940 A1 May 16, 2024

(51) Int. Cl.
- *B60L 3/00* (2019.01)
- *B60P 1/44* (2006.01)
- *B60W 10/26* (2006.01)
- *B60W 10/30* (2006.01)
- *B60W 30/18* (2012.01)

(52) U.S. Cl.
CPC ..... *B60W 30/18009* (2013.01); *B60P 1/4471* (2013.01); *B60W 10/26* (2013.01); *B60W 10/30* (2013.01); *B60W 2300/12* (2013.01)

(58) Field of Classification Search
CPC .......... B60W 30/18009; B60W 10/26; B60W 10/30; B60W 2300/12; B60P 1/4471
See application file for complete search history.

(56) References Cited

U.S. PATENT DOCUMENTS

| | | | |
|---|---|---|---|
| 3,905,438 A * | 9/1975 | Runyon | B62D 5/09 180/433 |
| 11,198,377 B2 * | 12/2021 | Hiratsuka | B60L 58/22 |
| 2024/0157798 A1 * | 5/2024 | Denning | B60L 3/0046 |

FOREIGN PATENT DOCUMENTS

| CN | 211332435 U | 8/2020 |
|---|---|---|
| CN | 111725584 B | 9/2020 |

\* cited by examiner

*Primary Examiner* — Gonzalo Laguarda

(57) ABSTRACT

As part of a start-up sequence, a controller of a machine causes one or more activation components of a battery of the machine to be enabled, then causes one or more electrical components associated with the battery to be enabled, then causes one or more non-accumulator components of a hydraulic system to be enabled, then causes one or more accumulator components of the hydraulic system to charge, and then causes one or more propulsion components to be enabled. As part of a shut-down sequence, the controller causes the one or more propulsion components to be disabled, then causes the one or more accumulator components of the hydraulic system to bleed, then causes the one or more non-accumulator components of the hydraulic system to be disabled, and then causes the one or more electrical components associated with the battery to be disabled.

20 Claims, 11 Drawing Sheets

SYSTEMS AND METHODS FOR STARTING UP AND SHUTTING DOWN A MACHINE

TECHNICAL FIELD

The present disclosure relates generally to starting up and shutting down a machine and, for example, to starting up and shutting down a machine with a battery.

BACKGROUND

Electric machines, such as vehicles or other mobile machines, that are at least partially powered by on-board batteries can be environmentally-friendly alternatives to machines powered by fossil fuels. However, in many cases, starting an electric machine requires that components and systems of the electric machine, such as a battery, a hydraulic system, a cooling system, and/or a propulsion system of the machine, be enabled or activated in a particular order to ensure that the electrical machine is able to perform a work task or another operation. Consequently, in some cases, enabling or activating the components and systems of the electric machine in a sub-optimal order results in damage to one or more of the components and systems. This can affect a performance and/or an operable life of the machine. For example, enabling the battery of the electric machine, and then enabling the propulsion system prior to enabling the cooling system and the hydraulic system can overheat the battery, which causes the battery to fail or provide sub-optimal power. The machine therefore may not be able to perform a work task, or may perform the task poorly, which further increases a risk of damage to the machine and the components and the systems of the machine. Stopping an electric machine also requires that the components and systems of the electric machine be disabled or inactivated in a particular order to prevent damage to the machine and the components and the systems.

The controller of the present disclosure solves one or more of the problems set forth above and/or other problems in the art.

SUMMARY

In some implementations, a method includes determining, by a controller of a machine, that one or more initiation components of the machine are enabled; causing, by the controller and based on determining that the one or more initiation components of the machine are enabled, one or more activation components of a battery of the machine to be enabled; causing, by the controller and based on causing the one or more activation components of the battery of the machine to be enabled, one or more electrical components associated with the battery of the machine to be enabled; causing, by the controller and based on causing the one or more electrical components of the machine to be enabled, one or more cooling components of the machine to be enabled; causing, by the controller and based on causing the one or more cooling components of the machine to be enabled, one or more non-accumulator components of a hydraulic system of the machine to be enabled; causing, by the controller and based on causing the one or more non-accumulator components of the hydraulic system of the machine to be enabled, one or more accumulator components of the hydraulic system of the machine to charge; and causing, by the controller and based on causing the one or more accumulator components of the hydraulic system of the machine to charge, one or more propulsion components of the machine to be enabled.

In some implementations, a controller of a machine comprising: one or more memories; and one or more processors configured to: cause, based on determining that one or more initiation components of the machine are enabled, one or more activation components of a battery of the machine to be enabled; cause, based on causing the one or more activation components of the battery of the machine to be enabled, one or more electrical components associated with the battery of the machine to be enabled; cause, based on causing the one or more electrical components of the machine to be enabled, one or more non-accumulator components of a hydraulic system of the machine to be enabled; cause, based on causing the one or more non-accumulator components of the hydraulic system of the machine to be enabled, one or more accumulator components of the hydraulic system of the machine to charge; and cause, based on causing the one or more accumulator components of the hydraulic system of the machine to charge, one or more propulsion components of the machine to be enabled.

In some implementations, a machine includes a battery; a hydraulic system; and a controller, wherein the controller is configured to: cause one or more activation components of the battery of the machine to be enabled; cause, based on causing the one or more activation components of the battery of the machine to be enabled, one or more electrical components associated with the battery of the machine to be enabled; cause, based on causing the one or more electrical components of the machine to be enabled, one or more non-accumulator components of the hydraulic system of the machine to be enabled; cause, based on causing the one or more non-accumulator components of the hydraulic system of the machine to be enabled, one or more accumulator components of the hydraulic system of the machine to charge; and cause, based on causing the one or more accumulator components of the hydraulic system of the machine to charge, one or more propulsion components of the machine to be enabled.

DETAILED DESCRIPTION

This disclosure relates to a systems and methods for starting up and shutting down a machine, which is applicable to any machine that is at least partially powered by a battery. The machine may be any type of machine configured to perform operations associated with an industry such as mining, construction, farming, transportation, or any other industry.

Figure 1:
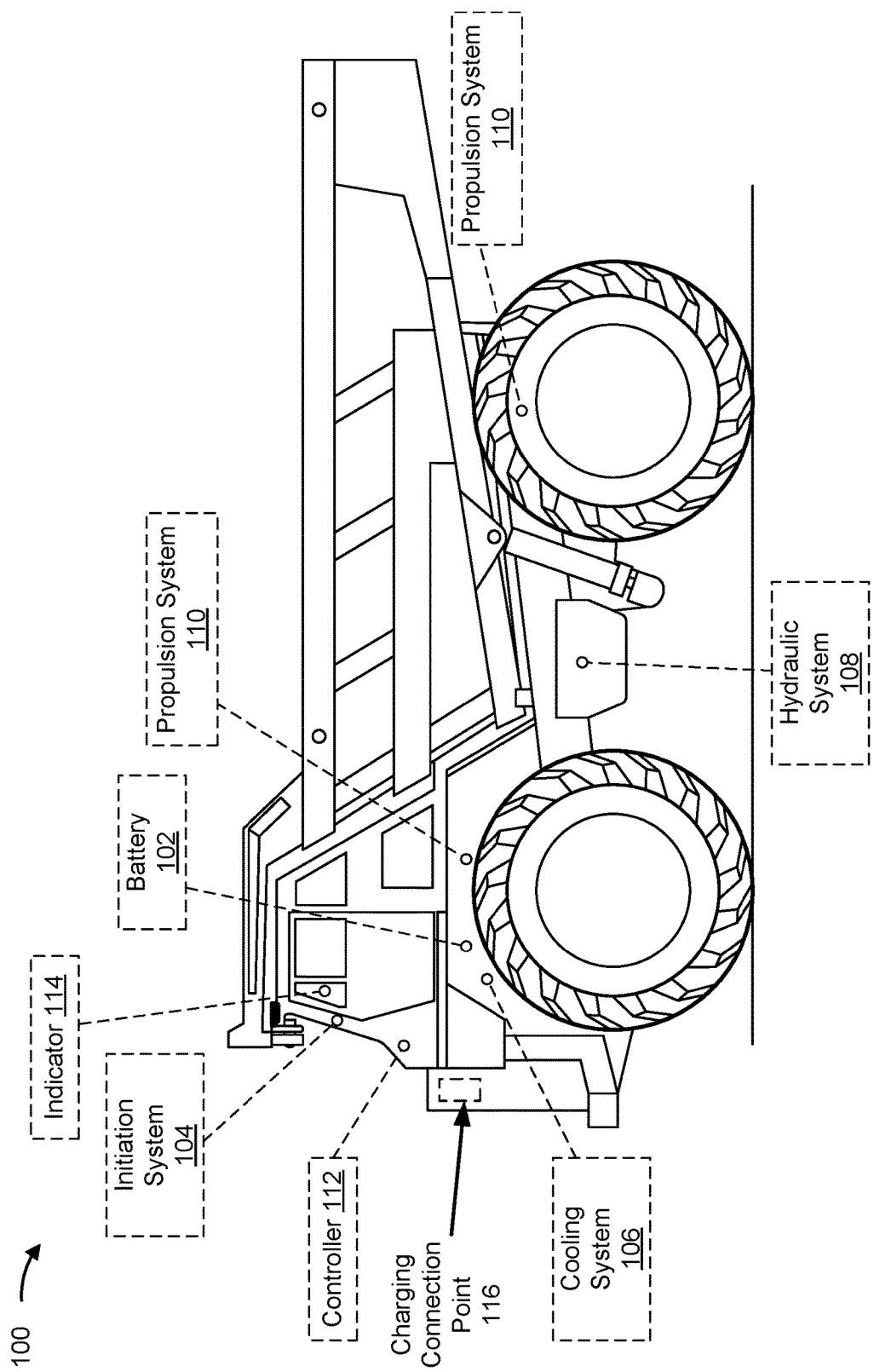
FIG. 1 is a diagram of an example machine described herein.

FIG. 1 is a diagram (e.g., a side-view) of an example machine 100 described herein. The machine 100 may be a mobile machine or vehicle, and may include a dump truck, a wheel loader, a hydraulic excavator, or another type of machine. Further, the machine 100 may be a manned machine or an unmanned machine. The machine 100 may be fully-autonomous, semi-autonomous, or remotely operated.

As further shown in FIG. 1, the machine 100 may include a battery 102, an initiation system 104, a cooling system 106, a hydraulic system 108, a propulsion system 110, a controller 112, an indicator 114, and/or a charging connection point 116.

The machine 100 may be configured to be at least partially powered by the battery 102. For example, the machine 100 may be a battery electric machine (BEM), a battery electric vehicle (BEV), a hybrid vehicle, a fuel cell and battery hybrid vehicle, or another machine that is at least partially powered by the battery 102. The machine 100 may include one or more electric engines, one or more electric motors, one or more electrical conversion systems, and/or other electrical components that are configured to convert and/or use energy, such as energy stored in the battery 102, to cause overall movement of the machine 100 across a work site and/or to cause movement of individual components or systems of the machine 100.

The battery 102 may include one or more batteries, such as one or more lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, the battery 102 may include one or more battery packs, one or more battery strings, one or more battery modules, and/or one or more battery cells.

The battery 102 may include one or more activation components (not shown in FIG. 1). For example, the battery 102 may include one or more switches, such as one or more key switches, that allow (or disallow) activation of the battery 102. For example, the battery 102 may be active, such as to provide power to one or more other components or systems of the machine 100, when the one or more activation components are enabled. In contrast, the battery 102 may be inactive, such as to not provide power to one or more other components or systems of the machine 100, when the one or more activation components are disabled.

The battery 102 may be associated with one or more electrical components (not shown in FIG. 1) of the machine 100, such as one or more electric power buses and/or one or more electric power converters, which may facilitate providing (or not providing) power to one or more other components or systems of the machine 100. For example, the one or more electrical components may facilitate providing power to one or more other components or systems of the machine 100 when the one or more electrical components are enabled. In contrast, the one or more electrical components may not facilitate providing power to one or more other components or systems of the machine 100 when the one or more electrical components are disabled. In a specific example, the battery 102 may include an electric power bus (e.g., operating at 750 volts (V)), a first electric power converter (e.g., a DC to DC (DCDC) converter operating at 24 V), and a second electric power converter (e.g., a DCDC converter operating at 600 V).

The initiation system 104 may include one or more initiation components (not shown in FIG. 1) of the machine 100. The one or more initiation components may include, for example, a first initiation component (e.g., an engagement "ring," or other component), a second initiation component (e.g., a physical button, or other component), a third initiation component (e.g., a toggle switch, or other component), and/or another initiation component. An operator of the machine 100 may interact (e.g., manually interact) with the one or more initiation components to initiate a start-up (or a shut-down) of the machine 100 and/or components or systems of the machine 100. For example, the operator may interact with the one or more initiation components (e.g., turn an engagement ring, push a physical button, or engage a toggle switch) to cause the one or more initiation components to be enabled, and thereby initiate a start-up of the machine 100 and/or components or systems of the machine 100, as described herein. In contrast, the operator may interact with the one or more initiation components to cause the one or more initiation components to be disabled, and thereby initiate a shut-down (or other process) of the machine 100 and/or components or systems of the machine 100, as described herein.

The cooling system 106 may include one or more cooling components (not shown in FIG. 1) of the machine 100. The one or more cooling components may include, for example, one or more cooling bladders, one or more pumps, and/or one or more tanks for holding a coolant. The cooling system 106 may be configured to cool the battery 102 (e.g., when the battery 102 is active). For example, the one or more cooling components may facilitate cooling of the battery 102 when the one or more cooling components are enabled. In contrast, the one or more cooling components may not facilitate cooling of the battery when the one or more cooling components are disabled.

The hydraulic system 108 may include one or more accumulator components (not shown in FIG. 1) and/or one or more non-accumulator components. The one or more accumulator components may be configured to store hydraulic fluid under (or not under) pressure. For example, the one or more accumulator components may charge to increase a pressure of the hydraulic fluid (and thereby "energize" the one or more accumulator components), or, alternatively, may bleed to decrease the pressure of the hydraulic fluid (and thereby "deenergize" the one or more accumulator components). The one or more non-accumulator components may include one or more pumps, one or more motors (e.g., one or more switch reluctance motors), one or more valves, one or more cylinders, one or more pistons, and/or other non-accumulator components. The one or more non-accumulator components may enable charging and/or bleeding of the one or more accumulator components. For example, the one or more non-accumulator components may facilitate charging of the one or more accumulator components when the one or more non-accumulator components are enabled. In contrast, the one or more non-accumulator components may facilitate bleeding (or prevent additional charging) of the one or more accumulator components when the one or more non-accumulator components are disabled. In some implementations, the one or more accumulator components and/or the one or more non-accumulator components may be configured to facilitate performance of one or more hydraulic functions of the machine 100 (e.g., raising or lowering a bed of the machine 100, or another hydraulic function), such as when the one or more accumulator components are charged.

The propulsion system 110 may include one or more propulsion components of the machine 100. The one or more propulsion components may include, for example, a drive train (e.g., that includes a transmission), wheels, axles, or other components that are configured to facilitate propulsion of the machine 100 (e.g., movement of the machine 100 at a work site). For example, the one or more propulsion components may facilitate propulsion of the machine when the one or more propulsion components are enabled. In contrast, the one or more propulsion components may not facilitate propulsion (or may prevent propulsion) of the machine when the one or more propulsion components are disabled.

The controller 112 may be an electronic control module (ECM) or other computing device. The controller 112 may be in communication (e.g., by a wired connection or a wireless connection) with the battery 102, the initiation system 104, the cooling system 106, the hydraulic system 108, the propulsion system 110, and/or the indicator 114. The controller 112 may also be in communication with other components and/or systems of the machine 100. The controller 112 may be configured to the control the battery 102, the initiation system 104, the cooling system 106, the hydraulic system 108, the propulsion system 110, and/or the indicator 114, as described herein (e.g., by generating and sending commands to the battery 102, the initiation system 104, the cooling system 106, the hydraulic system 108, the propulsion system 110, and/or the indicator 114).

The indicator 114 may include an aural component, a visual component, and/or haptic feedback component for providing information to the operator of the machine 100. For example, the indicator 114 may include a light-emitting component (e.g., that includes one or more light emitting diodes (LEDs)) that indicates information based on a color and/or emission pattern (e.g., flashing or steady-on) of light emitted by the light-emitting component.

The charging connection point 116 may be a wired or wireless energy transfer interface. For example, the charging connection point 116 may be an electrical plug, outlet, connector, charging port, or other wired electrical energy transfer interface that can be physically connected to an electrical power connector component (e.g., that is configured to charge the battery 102). As another example, the charging connection point 116 may be an inductive charging pad or other type of wireless energy transfer interface that can transfer energy wirelessly from the electrical power connector component. The charging connection point 116 may be located at a front of the machine 100, at a back of the machine 100, on a side of the machine 100, or at any other position on the machine 100.

As indicated above, FIG. 1 is provided as an example. Other examples may differ from what is described in connection with FIG. 1.

FIGS. 2A-2H are diagrams of one or more example implementations 200 described herein.

Figure 2A:
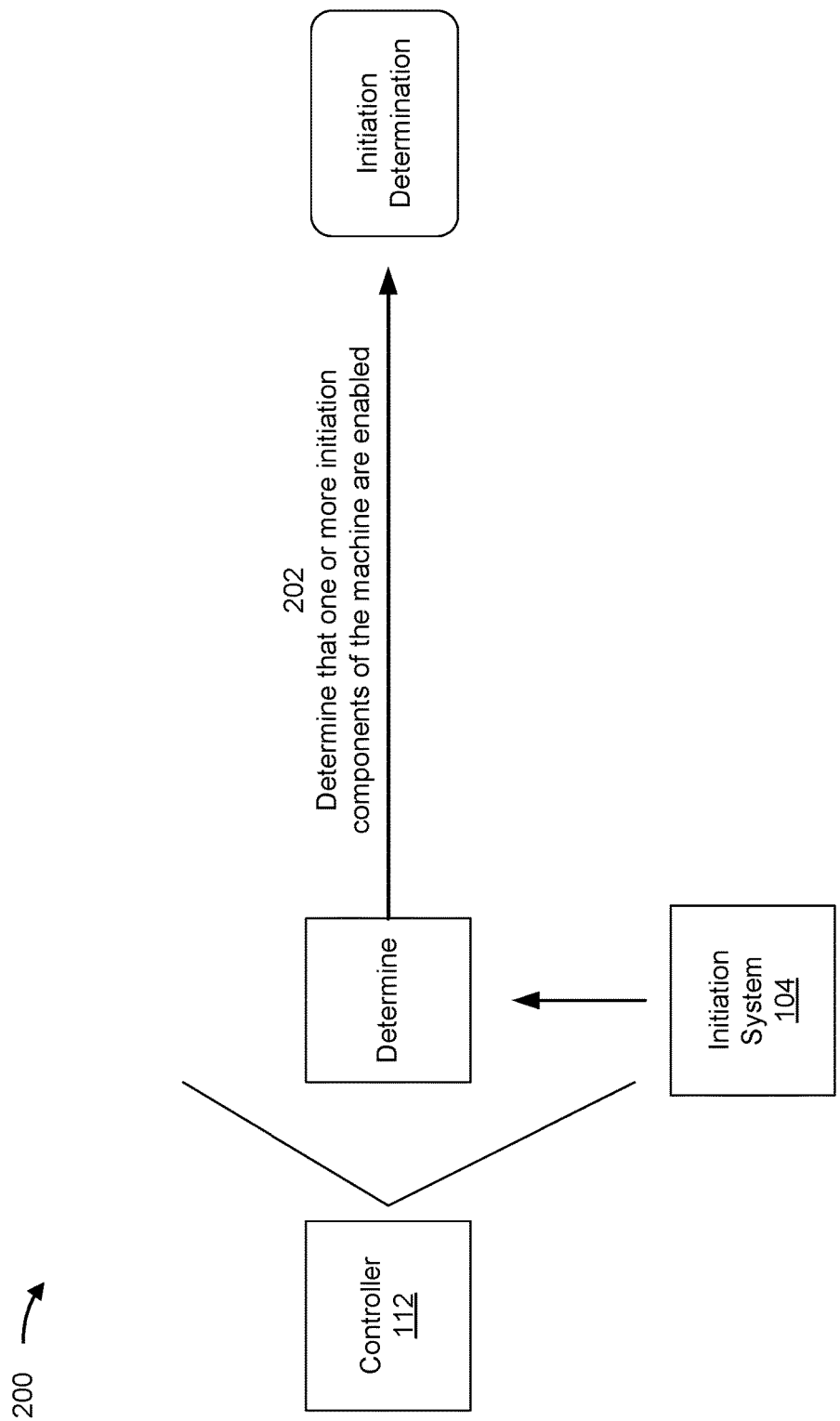
FIGS. 2A-2H are diagrams of one or more example implementations described herein.

As shown in FIG. 2A, and by reference number 202, the controller 112 may determine that the one or more initiation components (e.g., of the initiation system 104) are enabled. For example, an operator of the machine 100 may interact with the one or more initiation components (e.g., as described above) to cause the one or more initiation components to be enabled. In some implementations, such as when the initiation system 104 utilizes a security system (e.g., a machine security system (MSS)), the operator may need to provide a machine key (e.g., that includes an identification chip) to the initiation system 104 to cause the one or more initiation components to be enabled. The controller 112 may communicate with the initiation system 104 (and/or one or more sensors associated with the initiation system 104) to determine that the one or more initiation components are enabled (also referred to herein as making an "initiation determination").

In this way, the machine 100 may change from a "machine off" state to a "keyed on" state and/or to a "starting up" state. Accordingly, the controller 112 may cause the indicator 114 to indicate that the one or more initiation components are enabled (e.g., by causing the indicator 114 to emit a steady-on green light).

Figure 2B:
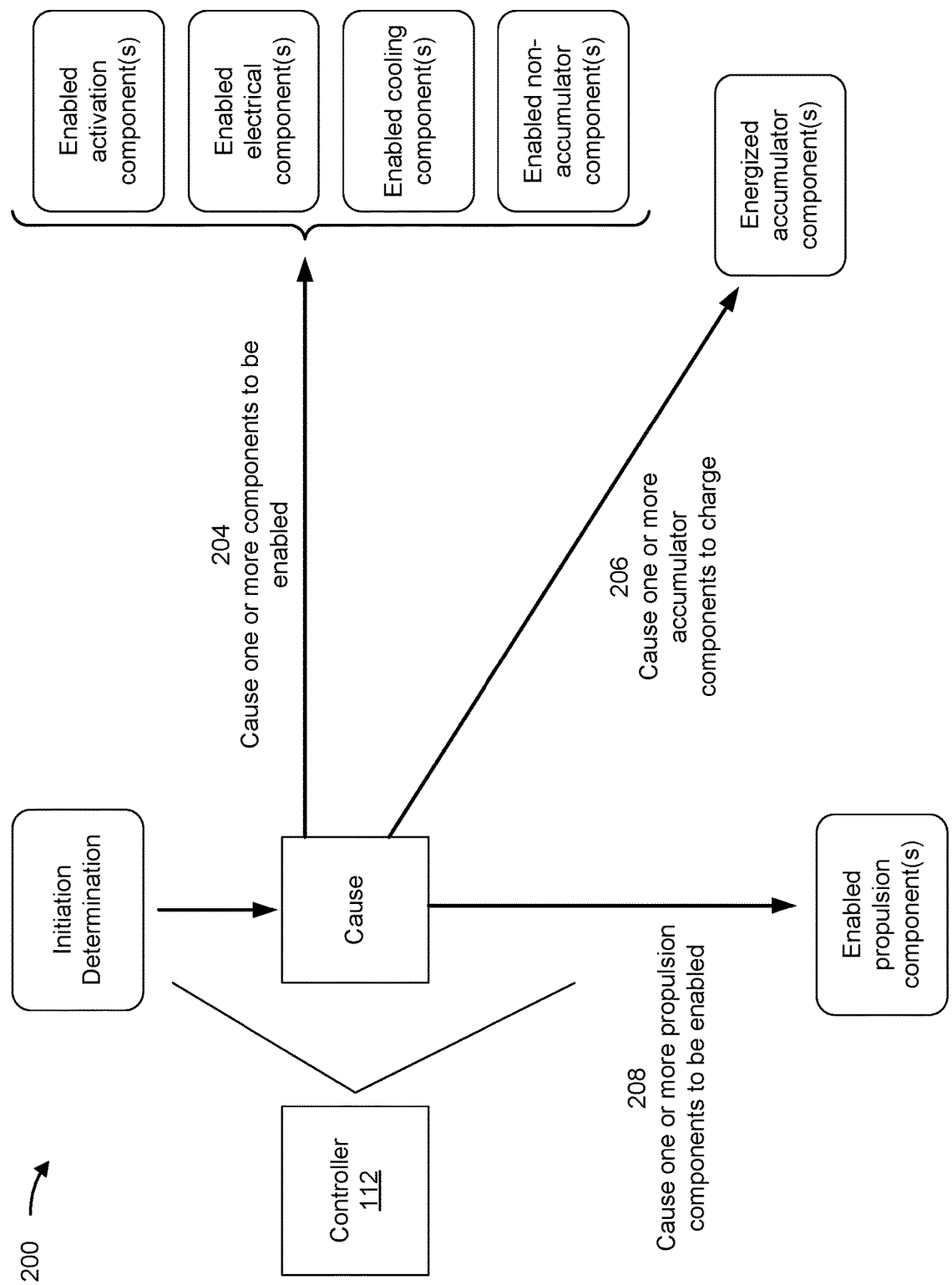

As shown in FIG. 2B, and by reference number 204, the controller 112 may cause one or more components to be enabled (e.g., based on the initiation determination). For example, the controller 112 may cause the one or more activation components (e.g., of the battery 102) to be enabled, the one or electrical components (e.g., associated with the battery 102) to be enabled, the one or more cooling components (e.g., of the cooling system 106) to be enabled, and/or the one or more non-accumulator components (e.g., of the hydraulic system 108) to be enabled. Causing the one or more activation components to be enabled may include causing one or more switches, such as one or more key switches, of the battery 102 to be enabled. Causing the one or more electrical components to be enabled may include causing one or more electric power buses and/or one or more electric power converters associated with the battery 102 to be enabled. Causing the one or more cooling components to be enabled may include causing one or more cooling bladders, one or more pumps, and/or one or more tanks of the cooling system 106 to be enabled. Causing the one or more non-accumulator components to be enabled may include causing one or more pumps, one or more motors, one or more valves, one or more cylinders, and/or one or more pistons of the hydraulic system 108 to be enabled.

The controller 112 may cause the one or more components to be enabled in a particular order (e.g., a particular enablement sequence). For example, the controller 112 may cause (e.g., based on determining that the one or more initiation components of the initiation system 104 are enabled) the one or more activation components (e.g., of the battery 102) to be enabled, may cause (e.g., based on causing the one or more activation components to be enabled) the one or electrical components (e.g., associated with the battery 102) to be enabled, may cause (e.g., based on causing the one or more electrical components to be enabled) the one or more cooling components (e.g., of the cooling system 106) to be enabled, and/or may cause (e.g., based on causing the one or more cooling components to be enabled) the one or more non-accumulator components (e.g., of the hydraulic system 108) to be enabled. In this way, the controller 112 causes the battery 102 to be active and then causes the battery 102 to provide power to other components and/or systems of the machine 100, including the cooling system 106 and the hydraulic system 108 (e.g., to permit the one or more cooling components of the cooling system 106 and/or the one or more non-accumulator components of the hydraulic system 108 to be enabled). The controller 112 then causes the cooling system 106 to facilitate cooling the battery 102 (e.g., by causing enablement of the one or electrical components and/or the one or more cooling components). The controller 112 then causes the one or more non-accumulator components of the hydraulic system 108 to be active (e.g., based on causing enablement of the one or electrical components and/or the one or non-accumulator components), which may further facilitate cooling the battery 102 (e.g., by causing a fan associated with the hydraulic system 108 to be active) and/or prepares the one or more non-accumulator components to facilitate charging of the one or more accumulator components of the hydraulic system 108, as described herein.

As shown by reference number 206, the controller 112 may cause the one or more accumulator components of the hydraulic system 108 to charge (e.g., based on causing the one or more components to be enabled, as described herein in relation to reference number 204). In this way, the controller 112 causes the one or more accumulator components to be energized (e.g., based on causing enablement of the one or electrical components and/or the one or non-accumulator components). This permits the machine 100 to perform one or more hydraulic functions.

As shown by reference number 208, the controller 112 may cause the one or more propulsion components (e.g., of the propulsion system 110) to be enabled (e.g., based on causing the one or more accumulator components to charge). Causing the one or more propulsion components to be enabled may include causing a drive train, wheels, and/or axles of the propulsion system 110 to be enabled. In this way, the controller 112 permits (e.g., based on causing enablement of the one or more propulsion components) propulsion of the machine 100 (e.g., permits the machine 100 to move from a first location at the work site to a second location at the work site).

In this way, the machine 100 changes from the starting up state to a "ready to run" state. Accordingly, the controller 112 may cause the indicator 114 to indicate that the one or more activation components, the one or electrical components, the one or more cooling components, the one or more non-accumulator components, and/or the one or more one or more propulsion components are enabled and/or that the one or more accumulator components are energized (e.g., by causing the indicator 114 to emit a steady-on green light).

Figure 2C:
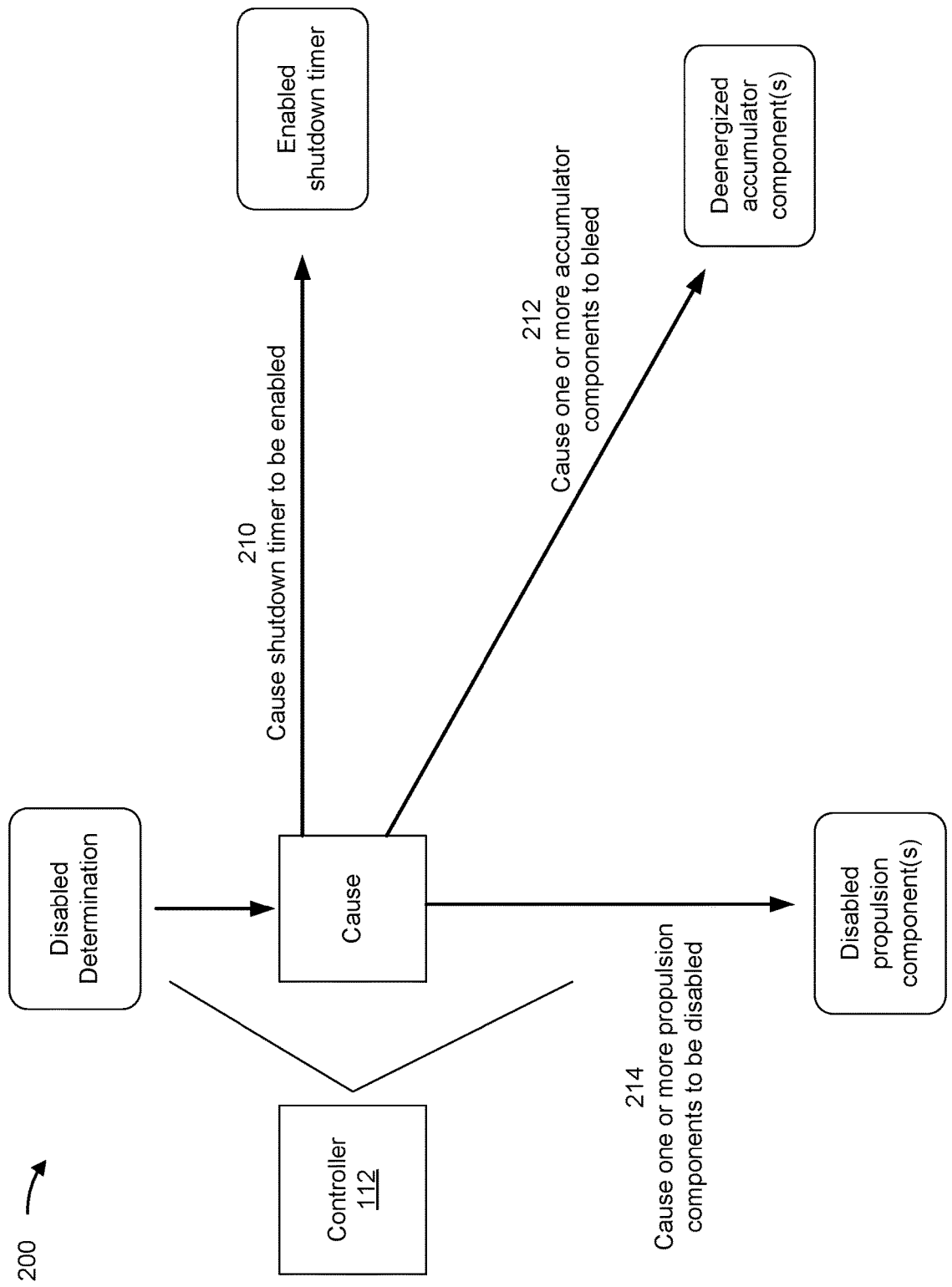

As shown in FIG. 2C, and by reference number 210, the controller 112 may cause a shutdown timer associated with the battery 102 to be enabled. For example, the operator of the machine 100 may interact with the one or more initiation components to cause at least one of initiation component, of the one or more initiation components, to be disabled (e.g., cause an engagement ring to be turned "off"). Accordingly, the controller 112 may determine that the at least one initiation component is disabled (e.g., based on communicating with the initiation system 104) and may cause (e.g., based on determining that the at least one initiation component is disabled) the shutdown timer to be enabled. The controller 112 may be configured to control one or more components of the machine 100 upon expiration of the shutdown timer, as further described herein (e.g., to prevent unnecessary usage of power provided by the battery 102 when the machine 100 is not otherwise being utilized). The shutdown timer may be for a particular amount of time, which may be less than or equal to, for example, 1 minute, 5 minutes, 10 minutes, 20 minutes, 30 minutes, 45 minutes, 1 hour, 2 hours, or another amount of time.

As shown by reference number 212, the controller 112 may cause the one or more accumulator components (e.g., of the hydraulic system 108) to bleed (e.g., based on causing the shutdown timer to be enabled). In this way, the controller 112 causes the one or more accumulator components to be deenergized, which reduces a likelihood that the one or more accumulator components and/or the one or more non-accumulator components of the hydraulic system 108, and/or other components and/or systems of the machine 100, will be damaged as a result of the machine 100 performing one or more other functions (e.g., non-hydraulic functions), such as a battery charging function (e.g., via the charging connection point 116).

As shown by reference number 214, the controller 112 may cause the one or more propulsion components (e.g., of the propulsion system 110) to be disabled (e.g., based on causing the one or more accumulator components to bleed). Causing the one or more propulsion components to be disabled may include causing a drive train, wheels, and/or axles of the propulsion system 110 to be disabled. In this way, the controller 112 prevents propulsion of the machine 100, which reduces a likelihood that the one or more propulsion components, and/or other components and/or systems of the machine 100, are damaged as a result of the machine 100 performing one or more other functions (e.g., non-propulsion functions), such as a battery charging function.

In this way, the machine 100 may change from the ready to run state to a "waiting to charge" state. Accordingly, the controller 112 may cause the indicator 114 to indicate that the shutdown timer is enabled, that the one or more accumulator components are deenergized, and/or that the one or more propulsion components of the machine are disabled (e.g., by causing the indicator 114 to emit a flashing red light).

In some implementations, the controller 112 may determine that the at least one initiation component is enabled (e.g., is re-enabled after being disabled) (also referred to herein as making an "enablement determination"). For example, the operator of the machine 100 may interact with the one or more initiation components to cause the at least one initiation component to be enabled (e.g., cause the engagement ring to be turned "on"). The controller 112 may determine that the at least one initiation component is enabled based on communicating with the initiation system 104.

In this way, the machine 100 may change from the waiting to charge state to a "waiting to restart state." Accordingly, the controller 112 may cause the indicator 114 to indicate that the at least one initiation component is enabled (e.g., by causing the indicator 114 to emit a steady-on green light). The controller 112 may then perform one or more processing steps associated with one of FIG. 2D or FIG. 2E.

Figure 2D:
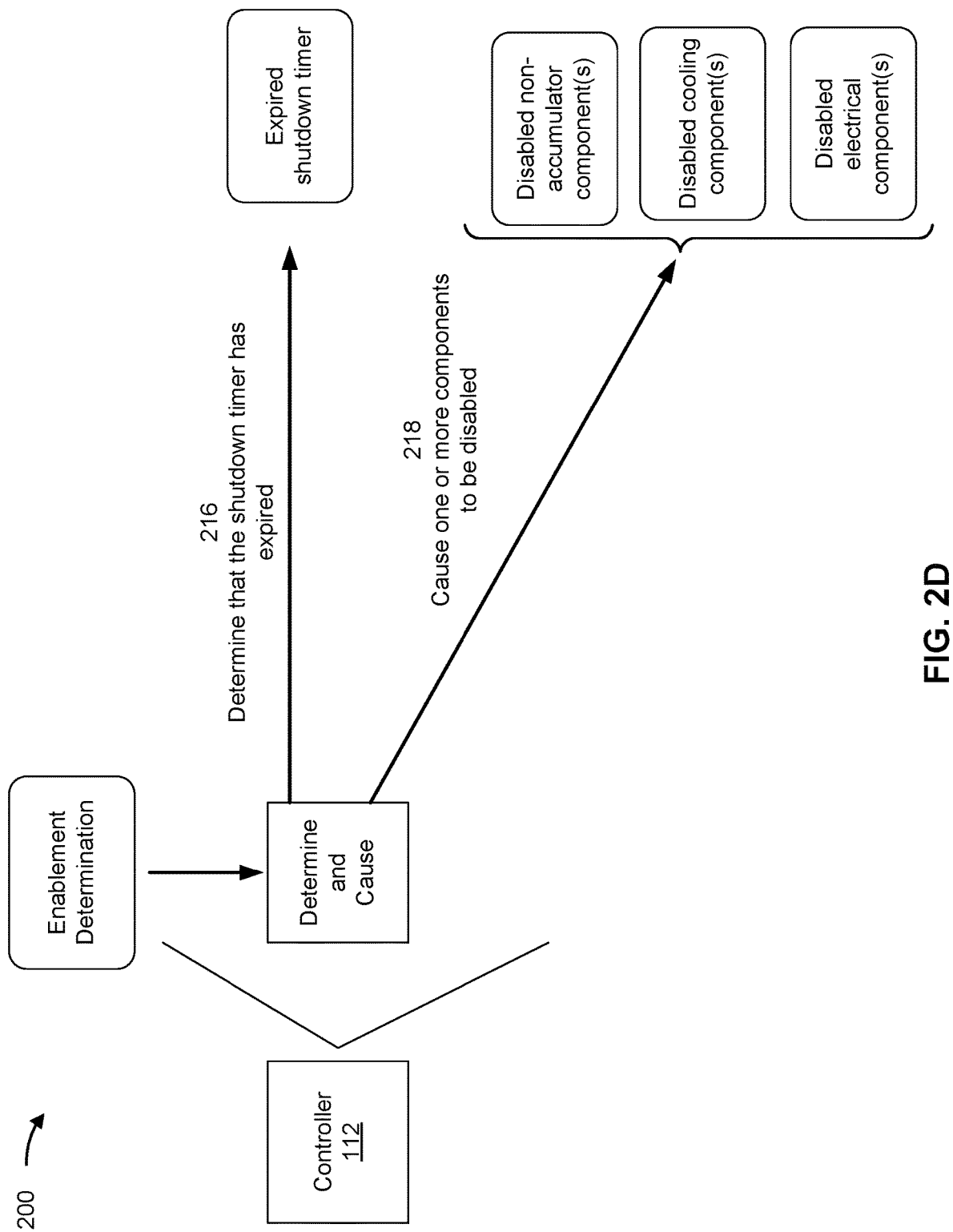

As shown in FIG. 2D, and by reference number 216, the controller 112 may determine that the shutdown timer has expired (e.g., based on the enablement determination). For example, the controller 112 may determine that an amount of time since the controller 112 caused the shutdown timer to be enabled is greater than an amount of time that was indicated by the shutdown timer.

Accordingly, as shown by reference number 218, the controller 112 may cause one or more components to be disabled (e.g., based on determining that the shutdown timer has expired). For example, the controller 112 may cause the one or more non-accumulator components (e.g., of the hydraulic system 108) to be disabled, the one or more cooling components (e.g., of the cooling system 106) to be disabled, and/or the one or electrical components (e.g., associated with the battery 102) to be disabled. Causing the one or more non-accumulator components to be disabled may include causing one or more pumps, one or more motors (e.g., switch reluctance motors), one or more valves, one or more cylinders, and/or one or more pistons of the hydraulic system 108 to be disabled. Causing the one or more cooling components to be disabled may include causing one or more cooling bladders, one or more pumps, and/or one or more tanks of the cooling system 106 to be disabled. Causing the one or more electrical components to be disabled may include causing one or more electric power buses and/or one or more electric power converters associated with the battery 102 to be disabled.

The controller 112 may cause the one or more components to be disabled in a particular order (e.g., a particular disablement sequence), which may be an opposite order of the particular order in which the one or more components were enabled (e.g., the particular disablement sequence may be an opposite sequence of the particular enablement sequence). For example, the controller 112 may cause (e.g., based on determining that the shutdown timer has expired) the one or more non-accumulator components (e.g., of the hydraulic system 108) to be disabled, may cause (e.g., based on causing the one or more non-accumulator components to be disabled) the one or more cooling components (e.g., of the cooling system 106) to be disabled, and/or may cause (e.g., based on causing the one or more cooling components to be disabled) the one or electrical components (e.g., associated with the battery 102) to be disabled. In this way, the controller 112 causes the one or non-accumulator components of the hydraulic system 108 to be inactive, and then causes the one or more cooling components of the cooling system 106 to be inactive, which serially minimizes a load on the battery 102. This reduces a likelihood that the hydraulic system 108, the cooling system 106, and/or the battery 102 will be damaged, such as due to a sudden decrease in load on the battery 102. The controller 112 then causes the battery 102 to be inactive, which further decreases a likelihood of damage to the battery 102.

In this way, the machine 100 may change from the waiting to restart state to the keyed on state (e.g., as described herein in relation to FIG. 2A). Accordingly, the controller 112 may cause the indicator 114 to indicate that the shutdown timer has expired and/or that the one or more non-accumulator components, the one or more cooling components, and/or the one or electrical components are disabled (e.g., by causing the indicator 114 to emit a steady-on red light).

Figure 2E:
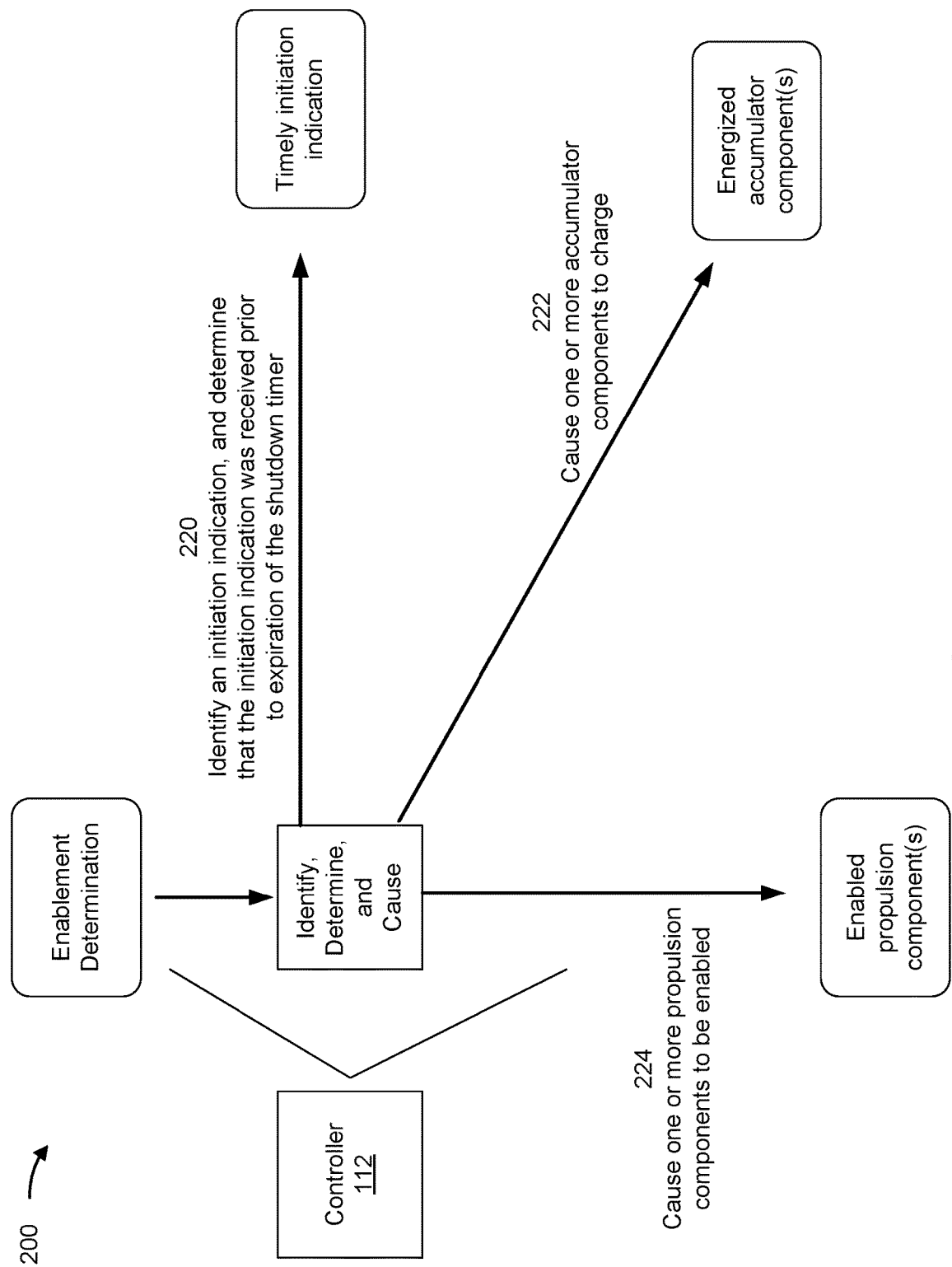

As shown in FIG. 2E, and by reference number 220, the controller 112 may identify an initiation indication (e.g., based on the enablement determination). For example, the operator of the machine 100 may interact with the one or more initiation components to input the initiation indication (e.g., by pressing a physical button). The initiation indication may indicate that the operator intends to cause the machine 100 to perform, for example, one or more propulsion functions and/or one or more hydraulic functions. The controller 112 may determine the initiation indication based on communicating with the initiation system 104.

As further shown by reference number 220, the controller 112 may determine that the initiation indication was received prior to expiration of the shutdown timer. For example, the controller 112 may determine that an amount of time since the controller 112 caused the shutdown timer to be enabled is less than or equal to an amount of time that was indicated by the shutdown timer. Accordingly, the initiation indication is also referred to herein as a "timely initiation indication."

Accordingly, as shown by reference number 222, the controller 112 may cause the one or more accumulator components of the hydraulic system 108 to charge (e.g., based on the timely initiation indication, and in a similar manner as that described herein in relation to FIG. 2B and reference number 206). In this way, the controller 112 causes the one or more accumulator components to be energized, which permits the machine 100 to perform one or more hydraulic functions.

As shown by reference number 224, the controller 112 may cause the one or more propulsion components (e.g., of the propulsion system 110) to be enabled (e.g., based on causing the one or more accumulator components to charge, and in a similar manner as that described herein in relation to FIG. 2B and reference number 208). In this way, the controller 112 permits (e.g., based on causing enablement of the one or more propulsion components) propulsion of the machine 100 (e.g., permits the machine 100 to move from a first location at the work site to a second location at the work site).

In this way, the machine 100 changes from the waiting to restart state to the ready to run state. Accordingly, the controller 112 may cause the indicator 114 to indicate that the one or more activation components, the one or electrical components, the one or more cooling components, the one or more non-accumulator components, and/or the one or more one or more propulsion components are enabled and/or that the one or more accumulator components are energized (e.g., by causing the indicator 114 to emit a steady-on green light).

Figure 2F:
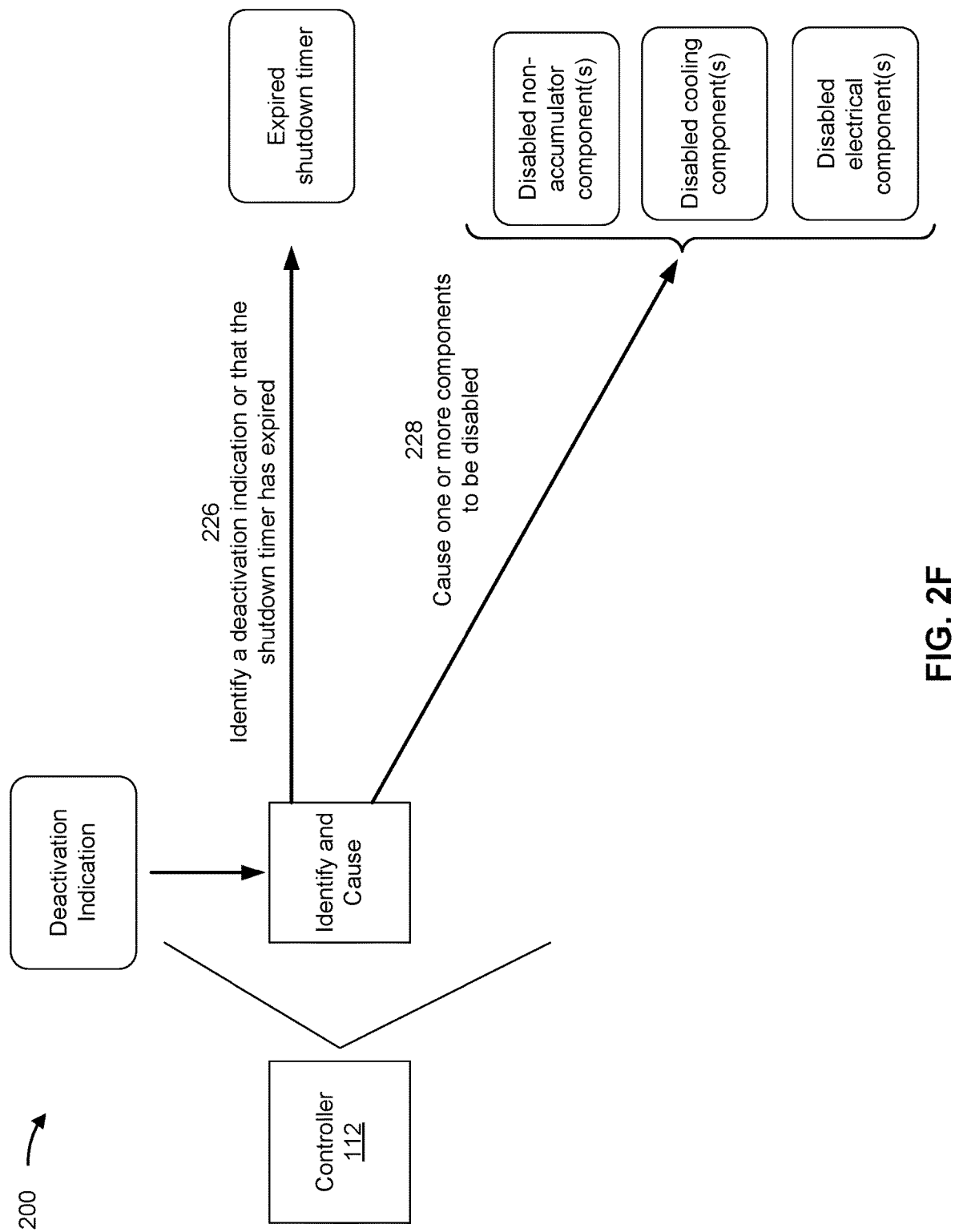

As shown in FIG. 2F, and by reference number 226, the controller 112 may identify a deactivation indication. For example, the operator of the machine 100 may interact with the one or more initiation components to input the deactivation indication (e.g., by pressing and holding a physical button for a period of time). The deactivation indication may indicate that the operator intends to cause the machine 100 to cease operation. The controller 112 may determine the deactivation indication based on communicating with the initiation system 104. Additionally, or alternatively, as further shown by reference number 226, the controller 112 may determine that the shutdown timer has expired (e.g., in a similar manner as that described herein in relation to FIG. 2D and reference number 216).

Accordingly, as shown by reference number 228, the controller 112 may cause one or more components to be disabled (e.g., based on identifying the deactivation indication or that the shutdown timer has expired). For example, the controller 112 may cause the one or more non-accumulator components (e.g., of the hydraulic system 108) to be disabled, the one or more cooling components (e.g., of the cooling system 106) to be disabled, and/or the one or electrical components (e.g., associated with the battery 102) to be disabled (e.g., in a similar manner as that described herein in relation to FIG. 2D and reference number 218).

In this way, the machine 100 may change from the waiting to charge state to a "shutting down" state and/or the machine off state. Accordingly, the controller 112 may cause the indicator 114 to indicate that the deactivation indication was identified or that the shutdown timer has expired, and/or that the one or more non-accumulator components, the one or more cooling components, and/or the one or electrical components are disabled (e.g., by causing the indicator 114 to emit no light).

Figure 2G:
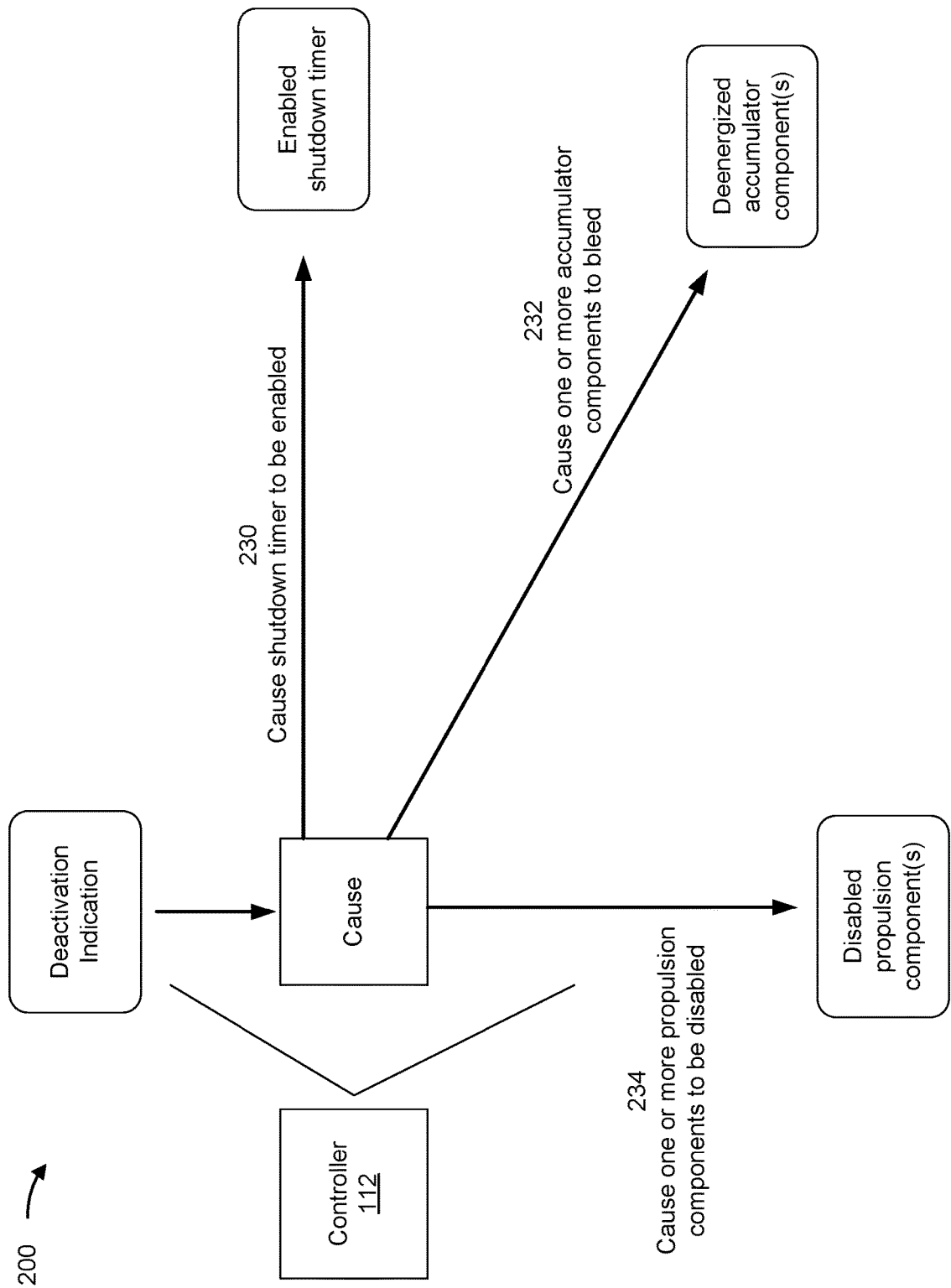

As shown in FIG. 2G, the controller 112 may identify the deactivation indication (e.g., in a similar manner as that described herein in relation to FIG. 2F and reference number 226). As shown by reference number 230, the controller may cause the shutdown timer associated with the battery 102 to be enabled (e.g., based on identifying the deactivation indication, and in a similar manner as that described herein in relation to FIG. 2C and reference number 210). As shown by reference number 232, the controller 112 may cause the one or more accumulator components (e.g., of the hydraulic system 108) to bleed (e.g., based on causing the shutdown timer to be enabled, and in a similar manner as that described herein in relation to FIG. 2C and reference number 212). As shown by reference number 234, the controller 112 may cause the one or more propulsion components (e.g., of the propulsion system 110) to be disabled (e.g., based on causing the one or more accumulator components to bleed, and in a similar manner as that described herein in relation to FIG. 2C and reference number 214).

In this way, the machine 100 may change from the ready to run state to an "exiting run" state. The controller 112 may cause the indicator 114 to indicate that that the deactivation indication was identified, that the shutdown timer is enabled, that the one or more accumulator components are deenergized, and/or that the one or more propulsion components of the machine are disabled (e.g., by causing the indicator 114 to emit a flashing red light).

Figure 2H:
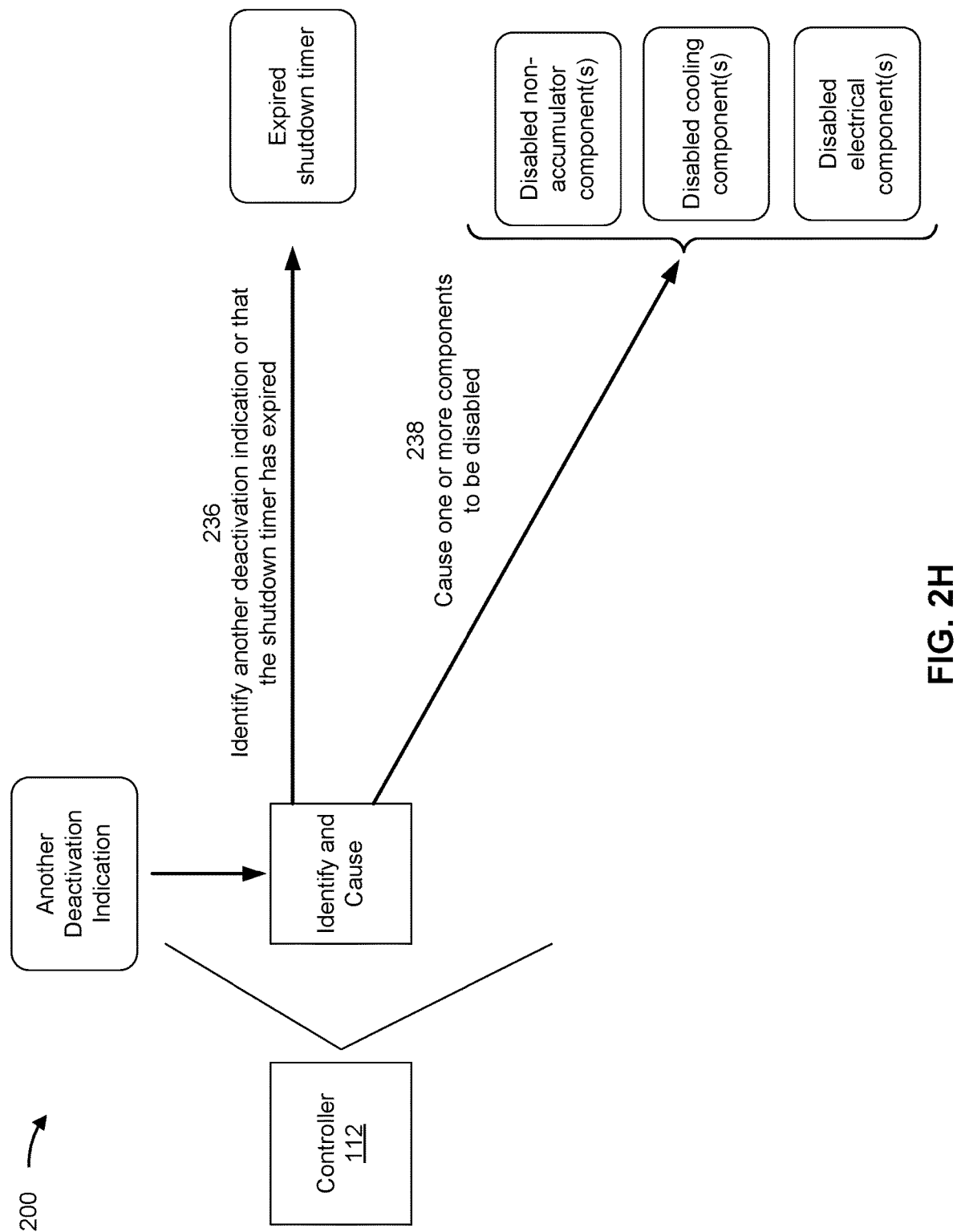

As shown in FIG. 2H, and by reference number 236, the controller 112 may identify another deactivation indication. For example, the operator of the machine 100 may interact with the one or more initiation components to input the other deactivation indication (e.g., by pressing and holding a physical button for a period of time). The other deactivation indication may indicate that the operator intends to cause the machine 100 to cease operation (and/or that the deactivation indication described herein in relation to FIG. 2G was not accidentally input by the operator). The controller 112 may determine the other deactivation indication based on communicating with the initiation system 104. Additionally, or alternatively, as further shown by reference number 236, the controller 112 may determine that the shutdown timer has expired (e.g., in a similar manner as that described herein in relation to FIG. 2D and reference number 216).

Accordingly, as shown by reference number 238, the controller 112 may cause one or more components to be disabled (e.g., based on identifying the other deactivation indication or that the shutdown timer has expired). For example, the controller 112 may cause the one or more non-accumulator components (e.g., of the hydraulic system 108) to be disabled, the one or more cooling components (e.g., of the cooling system 106) to be disabled, and/or the one or electrical components (e.g., associated with the battery 102) to be disabled (e.g., in a similar manner as that described herein in relation to FIG. 2D and reference number 218).

In this way, the machine 100 may change from the exiting run state to a "shutting down with key on" state. Accordingly, the controller 112 may cause the indicator 114 to indicate that the other deactivation indication was identified or that the shutdown timer has expired, and/or that the one or more non-accumulator components, the one or more cooling components, and/or the one or electrical components are disabled (e.g., by causing the indicator 114 to emit a steady-on red light).

As indicated above, FIGS. 2A-2H are provided as an example. Other examples may differ from what is described in connection with FIGS. 2A-2H.

Figure 3:
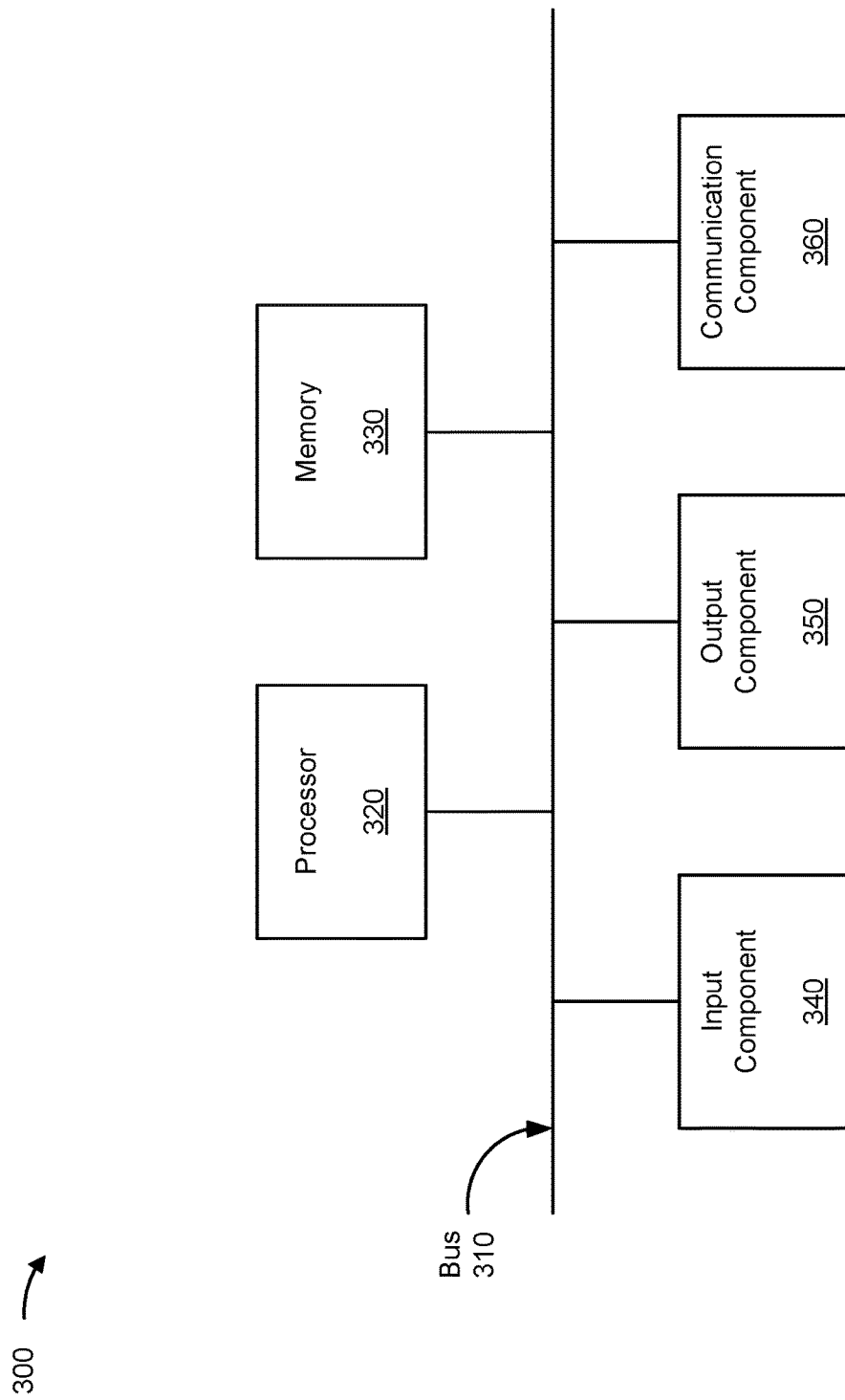
FIG. 3 is a diagram of example components of a device associated with starting up and shutting down a machine.

FIG. 3 is a diagram of example components of a device 300 associated with starting up and shutting down a machine. The device 300 may correspond to the controller 112 and/or one or more components of the battery 102, the initiation system 104, the cooling system 106, the hydraulic system 108, the propulsion system 110, and/or the indicator 114. The controller 112 and/or one or more components of the battery 102, the initiation system 104, the cooling system 106, the hydraulic system 108, the propulsion system 110, and/or the indicator 114 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. The processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. The memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. Execution of the set of instructions, by one or more processors 320, causes the one or more processors 320 and/or the device 300 to perform one or more operations or processes described herein. Hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
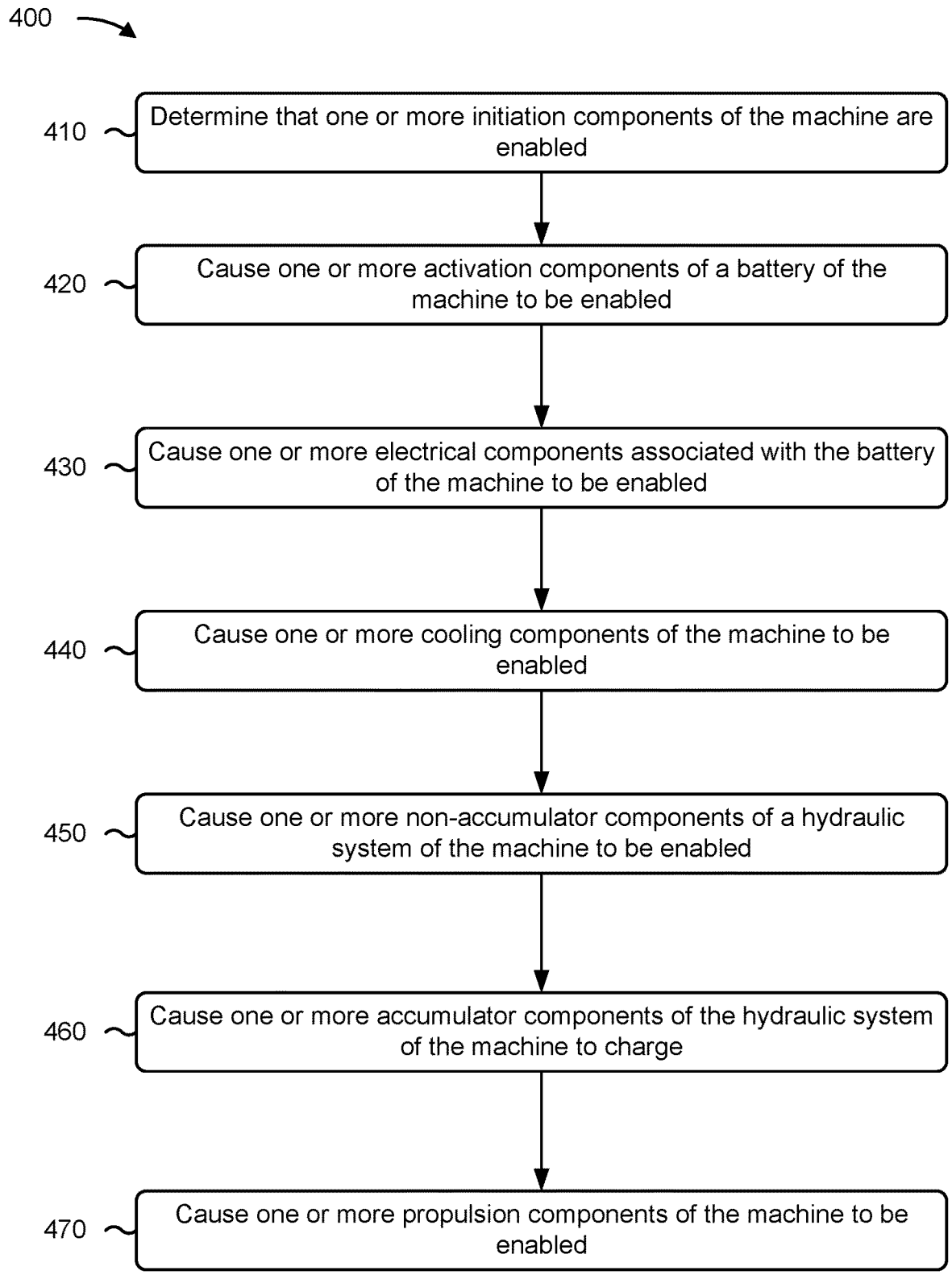
FIG. 4 is a flowchart of an example process associated with starting up and shutting down a machine.

FIG. 4 is a flowchart of an example process 400 associated with starting up and shutting down a machine. One or more process blocks of FIG. 4 may be performed by a controller (e.g., the controller 112). One or more process blocks of FIG. 4 may be performed by another device or a group of devices separate from or including the controller, such as one or more other components of the machine (e.g., one or more components of the battery 102, the initiation system 104, the cooling system 106, the hydraulic system 108, the propulsion system 110, and/or the indicator 114). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include determining that one or more initiation components of the machine are enabled (block 410). For example, the controller may determine that one or more initiation components of the machine are enabled, as described above.

As further shown in FIG. 4, process 400 may include causing one or more activation components of a battery of the machine to be enabled (block 420). For example, the controller may cause, based on determining that the one or more initiation components of the machine are enabled, one or more activation components of a battery of the machine to be enabled, as described above.

As further shown in FIG. 4, process 400 may include causing one or more electrical components associated with the battery of the machine to be enabled (block 430). For example, the controller may cause, based on causing the one or more activation components of the battery of the machine to be enabled, one or more electrical components associated with the battery of the machine to be enabled, as described above.

As further shown in FIG. 4, process 400 may include causing one or more cooling components of the machine to be enabled (block 440). For example, the controller may cause, based on causing the one or more electrical components of the machine to be enabled, one or more cooling components of the machine to be enabled, as described above.

As further shown in FIG. 4, process 400 may include causing one or more non-accumulator components of a hydraulic system of the machine to be enabled (block 450). For example, the controller may cause, based on causing the one or more cooling components of the machine to be enabled, one or more non-accumulator components of a hydraulic system of the machine to be enabled, as described above.

As further shown in FIG. 4, process 400 may include causing one or more accumulator components of the hydraulic system of the machine to charge (block 460). For example, the controller may cause, based on causing the one or more non-accumulator components of the hydraulic system of the machine to be enabled, one or more accumulator components of the hydraulic system of the machine to charge, as described above.

As further shown in FIG. 4, process 400 may include causing one or more propulsion components of the machine to be enabled (block 470). For example, the controller may cause, based on causing the one or more accumulator components of the hydraulic system of the machine to charge, one or more propulsion components of the machine to be enabled, as described above.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed controller (e.g., the controller 112) may be used in any machine that is at least partially powered by a battery to control at least a start-up and/or shut-down of the machine. During a start-up of the machine, the controller automatically enables, activates, and/or otherwise initiates components and systems of the machine (e.g., one or more components of a battery, a hydraulic system, a cooling system, and/or a propulsion system of the machine) in a particular order to ensure that the machine is able to perform one or more functions associated with operation of the machine. For example, the controller causes the battery to be active and then causes the battery to provide power to other components and/or systems of the machine, including the cooling system and the hydraulic system. The controller then causes the cooling system to facilitate cooling the battery, and then causes the hydraulic system to be active, which further facilitates cooling the battery (e.g., by causing a fan associated with the hydraulic system to be active). This reduces a likelihood that the battery will overheat (e.g., during start-up of the machine), and thereby reduces a likelihood that the battery will fail or be able to provide sub-optimal power. This reduces a likelihood of poor performance of the machine, and therefore reduces a likelihood of damage to the machine and the components and the systems of the machine due to a poor performance.

During a shut-down of the machine, the controller automatically disables, inactivates, and/or otherwise stops components and systems of the machine in a particular order (e.g., in an opposite order of the particular order associated with start-up of the machine) to ensure that the machine is not damaged. For example, the controller causes one or more accumulator components of the hydraulic system to be deenergized and/or the propulsion system to be disabled, which reduces a likelihood that the one or more accumulator components, the propulsion system, and other components and systems of the machine, will be damaged as a result of the machine shutting down. Additionally, the controller causes one or more non-accumulator components of the hydraulic system to be inactive, and then causes the one or more cooling components of the cooling system to be inactive, which serially minimizes a load on the battery. This reduces a likelihood that the hydraulic system, the cooling system, and/or the battery will be damaged, such as due to a sudden decrease in load on the battery. The controller then causes the battery to be inactive, which further decreases a likelihood of damage to the battery. This further reduces a likelihood of damage to the machine and the components and systems of the machine, thereby improving longevity and performance.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a controller of a machine, that one or more initiation components of the machine are enabled;
    causing, by the controller and after determining that the one or more initiation components of the machine are enabled, one or more activation components of a battery of the machine to be enabled;
    causing, by the controller and after causing the one or more activation components of the battery of the machine to be enabled, one or more electrical components associated with the battery of the machine to be enabled;
    causing, by the controller and after causing the one or more electrical components of the machine to be enabled, one or more cooling components of the machine to be enabled to facilitate cooling of the battery;
    causing, by the controller and after causing the one or more cooling components of the machine to be enabled, one or more non-accumulator components of a hydraulic system of the machine to be enabled;
    causing, by the controller and after causing the one or more non-accumulator components of the hydraulic system of the machine to be enabled, one or more accumulator components of the hydraulic system of the machine to charge to a particular pressure to perform a hydraulic function; and
    causing, by the controller and based on causing the one or more accumulator components of the hydraulic system of the machine to charge, one or more propulsion components of the machine to be enabled.

2. The method of claim 1, wherein causing the one or more propulsion components of the machine to be enabled permits the machine to move from a first location at a work site to a second location at the work site.

3. The method of claim 1, wherein causing the one or more accumulator components of the hydraulic system of the machine to charge permits the machine to perform one or more hydraulic functions.

4. The method of claim 1, further comprising:
    determining that at least one initiation component, of the one or more initiation components, of the machine is disabled;
    causing, based on determining that the at least one initiation component of the machine is disabled, a shutdown timer associated with the battery of the machine to be enabled;
    causing, based on causing the shutdown timer associated with the battery of the machine to be enabled, the one or more accumulator components of the hydraulic system of the machine to bleed; and
    causing, based on causing the shutdown timer associated with the battery of the machine to be enabled, the one or more propulsion components of the machine to be disabled.

5. The method of claim 4, further comprising:
    determining that the at least one initiation component of the machine is enabled;
    determining, based on determining that the at least one initiation component of the machine is enabled, that the shutdown timer associated with the battery of the machine has expired;
    causing, based on determining that the shutdown timer associated with the battery of the machine has expired, the one or more non-accumulator components of the hydraulic system of the machine to be disabled;
    causing, based on causing the one or more non-accumulator components of the hydraulic system of the machine to be disabled, the one or more cooling components of the machine to be disabled; and
    causing, based on causing the one or more cooling components of the machine to be disabled, the one or more electrical components associated with the battery of the machine to be disabled.

6. The method of claim 4, further comprising:
    determining that the at least one initiation component of the machine is enabled;
    identifying, based on determining that the at least one initiation component of the machine is enabled, an initiation indication;
    determining that the initiation indication was received prior to expiration of the shutdown timer associated with the battery of the machine;
    causing, based on determining that the initiation indication was received prior to the expiration of the shutdown timer associated with the battery of the machine, the one or more accumulator components of the hydraulic system of the machine to charge; and
    causing, based on causing the one or more accumulator components of the hydraulic system of the machine to charge, the one or more propulsion components of the machine to be enabled.

7. The method of claim 4, further comprising:
    identifying a deactivation indication or that the shutdown timer associated with the battery of the machine has expired;
    causing, based on identifying the deactivation indication or that the shutdown timer associated with the battery of the machine has expired, the one or more non-accumulator components of the hydraulic system of the machine to be disabled;
    causing, based on causing the one or more non-accumulator components of the hydraulic system of the machine to be disabled, the one or more cooling components of the machine to be disabled; and causing, based on causing the one or more cooling components of the machine to be disabled, the one or more electrical components associated with the battery of the machine to be disabled.

8. The method of claim 1, further comprising:
identifying a deactivation indication;
causing, based on identifying the deactivation indication, a shutdown timer associated with the battery of the machine to be enabled;
causing, based on causing the shutdown timer associated with the battery of the machine to be enabled, the one or more accumulator components of the hydraulic system of the machine to bleed; and
causing, based on causing the shutdown timer associated with the battery of the machine to be enabled, the one or more propulsion components of the machine to be disabled.

9. The method of claim 8, further comprising:
identifying another deactivation indication or that the shutdown timer associated with the battery of the machine has expired;
causing, based on identifying the other deactivation indication or that the shutdown timer associated with the battery of the machine has expired, the one or more non-accumulator components of the hydraulic system of the machine to be disabled;
causing, based on causing the one or more non-accumulator components of the hydraulic system of the machine to be disabled, the one or more cooling components of the machine to be disabled; and
causing, based on causing the one or more cooling components of the machine to be disabled, the one or more electrical components associated with the battery of the machine to be disabled.

10. A controller of a machine comprising:
one or more memories; and
one or more processors configured to:
cause, after determining that one or more initiation components of the machine are enabled, one or more activation components of a battery of the machine to be enabled;
cause, after causing the one or more activation components of the battery of the machine to be enabled, one or more electrical components associated with the battery of the machine to be enabled;
cause, after causing the one or more electrical components of the machine to be enabled, one or more non-accumulator components of a hydraulic system of the machine to be enabled;
cause, after causing the one or more non-accumulator components of the hydraulic system of the machine to be enabled, one or more accumulator components of the hydraulic system of the machine to charge to a particular pressure to perform a hydraulic function; and
cause, after causing the one or more accumulator components of the hydraulic system of the machine to charge, one or more propulsion components of the machine to be enabled.

11. The controller of claim 10, wherein the one or more processors, to cause the one or more electrical components associated with the battery of the machine to be enabled, are configured to cause at least one of:
one or more electric power buses associated with the battery of the machine to be enabled, or
one or more electric power converters associated with the battery of the machine to be enabled.

12. The controller of claim 10, wherein causing the one or more electrical components associated with the battery of the machine to be enabled permits one or more cooling components of the machine to be enabled.

13. The controller of claim 10, wherein the one or more processors, to cause the one or more propulsion components of the machine to be enabled, are configured to:
cause one or more components of a drive train of the machine to be enabled.

14. The controller of claim 10, wherein the one or more processors are further configured to:
cause, based on determining that at least one initiation component, of the one or more initiation components, of the machine is disabled, a shutdown timer associated with the battery of the machine to be enabled;
cause, based on causing the shutdown timer associated with the battery of the machine to be enabled, the one or more accumulator components of the hydraulic system of the machine to bleed; and
cause, based on causing the shutdown timer associated with the battery of the machine to be enabled, the one or more propulsion components of the machine to be disabled.

15. The controller of claim 14, wherein the one or more processors are further configured to:
determine, based on determining that the at least one initiation component of the machine is enabled, that the shutdown timer associated with the battery of the machine has expired;
cause, based on determining that the shutdown timer associated with the battery of the machine has expired, the one or more non-accumulator components of the hydraulic system of the machine to be disabled; and
cause, based on causing the one or more non-accumulator components of the hydraulic system of the machine to be disabled, the one or more electrical components associated with the battery of the machine to be disabled.

16. The controller of claim 14, wherein the one or more processors are further configured to:
identify a deactivation indication or that the shutdown timer associated with the battery of the machine has expired;
cause, based on identifying the deactivation indication or that the shutdown timer associated with the battery of the machine has expired, the one or more non-accumulator components of the hydraulic system of the machine to be disabled; and
cause, based on causing the one or more non-accumulator components of the hydraulic system of the machine to be disabled, the one or more electrical components associated with the battery of the machine to be disabled.

17. The controller of claim 10, wherein the one or more processors are further configured to:
cause, based on identifying a deactivation indication, a shutdown timer associated with the battery of the machine to be enabled;
cause, based on causing the shutdown timer associated with the battery of the machine to be enabled, the one or more accumulator components of the hydraulic system of the machine to bleed; and
cause, based on causing the shutdown timer associated with the battery of the machine to be enabled, the one or more propulsion components of the machine to be disabled.

18. The controller of claim 17, wherein the one or more processors are further configured to:
- identify another deactivation indication or that the shutdown timer associated with the battery of the machine has expired;
- cause, based on identifying the other deactivation indication or that the shutdown timer associated with the battery of the machine has expired, the one or more non-accumulator components of the hydraulic system of the machine to be disabled; and
- cause, based on causing the one or more non-accumulator components of the hydraulic system of the machine to be disabled, the one or more electrical components associated with the battery of the machine to be disabled.

19. A machine, comprising:
a battery;
a hydraulic system; and
a controller, wherein the controller is configured to:
- cause one or more activation components of the battery of the machine to be enabled;
- cause, after causing the one or more activation components of the battery of the machine to be enabled, one or more electrical components associated with the battery of the machine to be enabled;
- cause, after causing the one or more electrical components of the machine to be enabled, one or more non-accumulator components of the hydraulic system of the machine to be enabled;
- cause, after causing the one or more non-accumulator components of the hydraulic system of the machine to be enabled, one or more accumulator components of the hydraulic system of the machine to charge to a particular pressure to perform a hydraulic function; and
- cause, after causing the one or more accumulator components of the hydraulic system of the machine to charge, one or more propulsion components of the machine to be enabled.

20. The machine of claim 19, wherein the controller is further configured to:
- cause, after causing the one or more propulsion components of the machine to be enabled, the one or more propulsion components of the machine to be disabled;
- cause, after causing the one or more propulsion components of the machine to be disabled, the one or more accumulator components of the hydraulic system of the machine to bleed;
- cause, after causing the one or more accumulator components of the hydraulic system of the machine to bleed, the one or more non-accumulator components of the hydraulic system of the machine to be disabled; and
- cause, after causing the one or more non-accumulator components of the hydraulic system of the machine to be disabled, the one or more electrical components associated with the battery of the machine to be disabled.

* * * * *